(12) United States Patent
Ehrhard et al.

(10) Patent No.: US 12,319,408 B2
(45) Date of Patent: Jun. 3, 2025

(54) FAIRING ARRANGEMENT FOR A HIGH-LIFT MECHANISM OF AN AIRCRAFT

(71) Applicant: Airbus Operations GmbH, Hamburg (DE)

(72) Inventors: Wolfgang Ehrhard, Hamburg (DE); Luc Andreani, Hamburg (DE); Florian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 8 days.

(21) Appl. No.: 18/543,103

(22) Filed: Dec. 18, 2023

(65) Prior Publication Data
US 2024/0199196 A1  Jun. 20, 2024

(30) Foreign Application Priority Data
Dec. 20, 2022 (EP) .................................... 22214915

(51) Int. Cl.
*B64C 9/02* (2006.01)
*B64C 3/48* (2006.01)
(Continued)

(52) U.S. Cl.
CPC .................. *B64C 9/02* (2013.01); *B64C 3/48* (2013.01); *B64C 3/50* (2013.01); *B64C 7/00* (2013.01); *B64C 9/16* (2013.01); *B64C 9/18* (2013.01)

(58) Field of Classification Search
CPC .... B64C 9/02; B64C 9/16; B64C 9/18; B64C 3/48; B64C 3/50; B64C 7/00
See application file for complete search history.

(56) References Cited

U.S. PATENT DOCUMENTS 4,854,528 A * 8/1989 Hofrichter ................ B64C 9/18
244/130
2012/0292453 A1   11/2012 Schroeder
(Continued)

FOREIGN PATENT DOCUMENTS

EP      2516257 B1     3/2016
EP      3434583 B1    12/2020

OTHER PUBLICATIONS

European Search Report for corresponding European Patent Application No. 22214915 dated Jun. 2, 2023; priority document.
(Continued)

*Primary Examiner* — Rodney A Bonnette
(74) *Attorney, Agent, or Firm* — Greer, Burns & Crain, Ltd.

(57) ABSTRACT

A fairing arrangement for an aircraft high-lift mechanism, the high-lift mechanism including a flap arranged at an aircraft wing trailing edge and a mounting and guiding mechanism for the flap. The fairing arrangement includes a flap side fairing unit and a wing side fairing unit. The flap side fairing unit includes a flap side fairing covering an aft part of the mounting and guiding mechanism and a flap side fairing mount mounting the flap side fairing to the flap. The wing side fairing unit includes a wing side fairing covering a forward part of the mounting and guiding mechanism and a wing side fairing mount mounting the wing side fairing to the wing. The wing side fairing mount is configured to connect the wing side fairing movably to the wing such that the wing side fairing is rotatable around an axis directed at least partially in a vertical direction.

14 Claims, 5 Drawing Sheets

(51) Int. Cl.
*B64C 3/50* (2006.01)
*B64C 7/00* (2006.01)
*B64C 9/16* (2006.01)
*B64C 9/18* (2006.01)

(56) References Cited

U.S. PATENT DOCUMENTS

| | | |
|---|---|---|
| 2016/0068255 A1 | 3/2016 | Soenarjo |
| 2017/0158310 A1 | 6/2017 | Osborn et al. |
| 2019/0031317 A1 | 1/2019 | Tsai et al. |
| 2020/0407041 A1* | 12/2020 | Tsai .......................... B64C 7/00 |
| 2021/0316840 A1 | 10/2021 | Machunze et al. |
| 2022/0306274 A1 | 9/2022 | Tulloch |
| 2024/0253768 A1* | 8/2024 | Lorenz ...................... B64C 9/34 |
| 2024/0343380 A1* | 10/2024 | Andreani .................. B64C 9/16 |

OTHER PUBLICATIONS

Airbus Press Release of Sep. 22, 2021, https://www.airbus.com/en/newsroom/press-releases/2021-09-airbus-launches-extra-high-performance-wing-demonstrator-to-fortify.
Airbus Press Release of Apr. 12, 2022, https://www.airbus.com/en/newsroom/press-releases/2022-04-nature-inspired-wing-demonstrator-completes-wind-tunnel-tests.

* cited by examiner

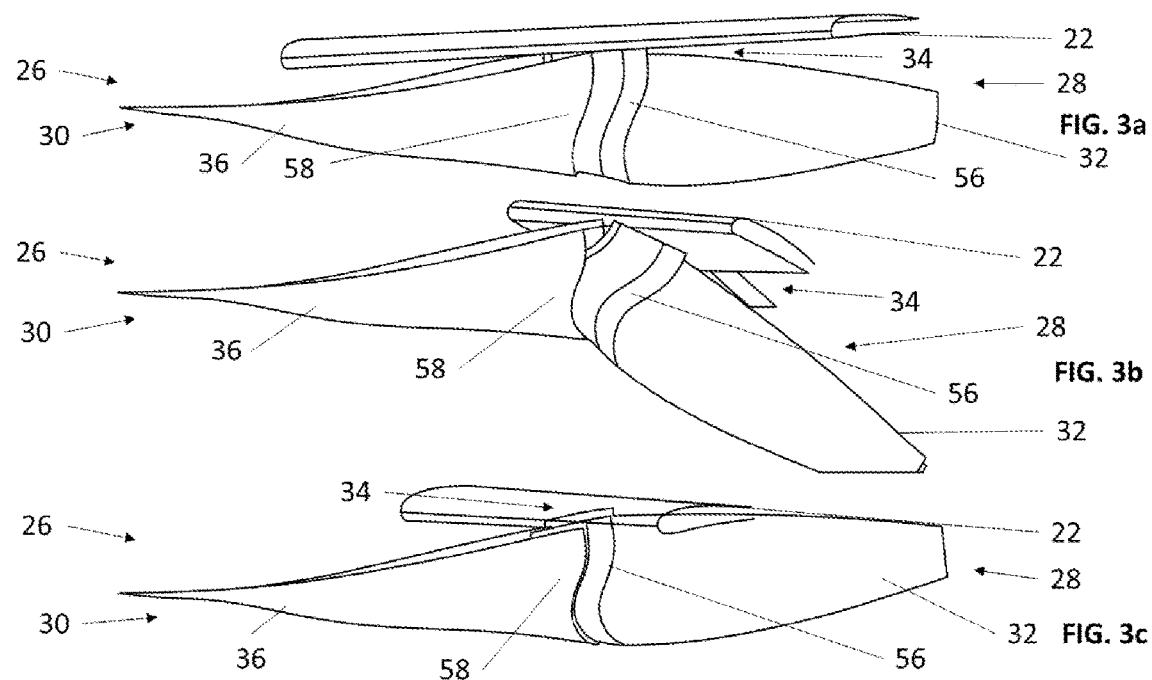
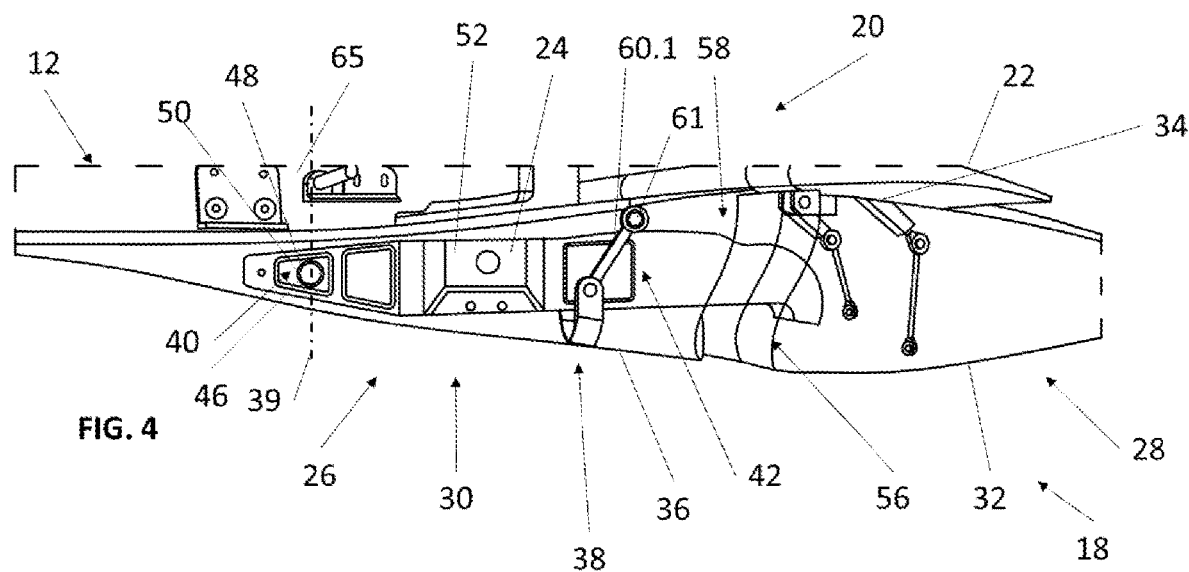

FAIRING ARRANGEMENT FOR A HIGH-LIFT MECHANISM OF AN AIRCRAFT

CROSS-REFERENCES TO RELATED APPLICATIONS

This application claims the benefit of the European patent application No. 22214915.5 filed on Dec. 20, 2022, the entire disclosures of which are incorporated herein by way of reference.

FIELD OF THE INVENTION

The invention relates to a fairing arrangement for a high-lift mechanism of an aircraft, wherein the high-lift mechanism includes a flap to be arranged at a trailing edge of an aircraft wing and a mounting and guiding mechanism for the flap. Further the invention relates to a high-lift system, an aircraft wing and an aircraft comprising such fairing arrangement.

BACKGROUND OF THE INVENTION

With regard to prior art, reference is made to the following citations:
[1] U.S. Pat. No. 2,022,306 274 A1
[2] U.S. Pat. No. 2,021,316 840 A1
[3] U.S. Pat. No. 2,016,068 255 A1
[4] EP 2 516 257 B1
[5] Airbus press release of Sep. 22, 2021, https://www.airbus.com/en/newsroom/press-releases/2021-09-airbus-launches-extra-high-performance-wing-demonstrator-to-fortify
[6] Airbus press release of Apr. 12, 2022, https://www.airbus.com/en/newsroom/press-releases/2022-04-nature-inspired-wing-demonstrator-completes-wind-tunnel-tests References [1] to [4] disclose a fairing arrangement for a high-lift mechanism of an aircraft, wherein the high-lift mechanism includes a flap to be arranged at a trailing edge of an aircraft wing and a mounting and guiding mechanism for the flap, the fairing arrangement comprising a flap side fairing unit and a wing side fairing unit, the flap side fairing unit comprising a flap side fairing for covering an aft part of the mounting and guiding mechanism and a flap side fairing mount for movably mounting the flap side fairing to the flap, the wing side fairing unit comprising a wing side fairing for covering a forward part of the mounting and guiding mechanism and a wing side fairing mount for mounting the wing side fairing in a rigidly fixed manner to the wing.

SUMMARY OF THE INVENTION

An object of the invention is to functionally improve such fairing arrangements.

The invention provides a fairing arrangement for a high-lift mechanism of an aircraft, wherein the high-lift mechanism includes a flap to be arranged at a trailing edge of an aircraft wing and a mounting and guiding mechanism for the flap,
the fairing arrangement comprising a flap side fairing unit and a wing side fairing unit,
the flap side fairing unit comprising a flap side fairing for covering an aft part of the mounting and guiding mechanism and a flap side fairing mount for mounting the flap side fairing to the flap,
the wing side fairing unit comprising a wing side fairing for covering a forward part of the mounting and guiding mechanism and a wing side fairing mount for mounting the wing side fairing to the wing,
wherein the wing side fairing mount is configured to connect the wing side fairing such that it is rotatable around an axis directed at least partially in a vertical direction.

Preferably, the wing side fairing unit is configured such that a rear part of the wing side fairing to be engaged with the flap side fairing is movable in a limited predefined manner in a spanwise direction.

Preferably, the wing side fairing mount comprises a forward connecting mechanism configured to connect a forward part of the wing side fairing rotatably with at least one or with two degrees of freedom to the mounting and guiding mechanism.

Preferably, the forward connecting mechanism includes a spherical bearing. Preferably, the forward connecting mechanism allows movement of a forward part of the wing side fairing in at least two degrees of freedom, especially by a rotation about a first axis that has at least a direction component in the vertical direction (e.g., the vertical direction is the lift direction of the wing) and by a rotation about a second axis extending or essentially extending in the flight direction.

Preferably, the wing side fairing mount comprises a rearward connecting mechanism configured to connect a rearward part of the wing side fairing such that it is movable in a spanwise direction.

Preferably, the rearward connecting mechanism includes a swing strut. Preferably, the rearward connecting mechanism includes a pair of parallel swing struts. Preferably, the rearward connecting mechanism includes a tensile means, i.e., flexible means such as a cable or a chain. Preferably, the rearward connecting mechanism includes an arrangement of a track and rollers or sliders. Preferably, the rearward connecting mechanism includes an upper track and roller or slider arrangement and/or a lower track and roller or slider arrangement. Preferably, the rearward connecting mechanism includes a track curved around a rotation axis of the forward connecting mechanism in combination with a set of rollers or sliders running on the track. Preferably, the rearward connecting mechanism includes a linear bearing.

Preferably, a forward end portion of the flap side fairing engages into a rearward end portion of the wing side fairing in order to allow a telescopic and rotational relative movement of the fairings.

Preferably, the fairing arrangement further comprises a fixed front fairing unit configured to be rigidly fixed to the wing, wherein the wing side fairing unit is configured as intermediate movable wing side fairing unit arranged between fixed front fairing unit and the flap side fairing unit.

According to another aspect, the invention provides a high-lift system for an aircraft, comprising:
a high-lift mechanism including a flap to be arranged at a trailing edge of an aircraft wing and a mounting and guiding mechanism for the flap (also called flap support in the prior art), and
a fairing arrangement according to any of the aforementioned embodiments.

According to another aspect, the invention provides an aircraft wing comprising such a high-lift system and/or a fairing arrangement according to any of the aforementioned embodiments.

According to another aspect, the invention provides an aircraft, comprising a wing arrangement including such a wing and/or such a high-lift system and/or a fairing arrangement according to any of the aforementioned embodiments.

The invention lies on the technical field of aircraft high-lift systems and especially relates to fairings of such high-lift systems.

Preferred embodiments of the invention propose improved fairing kinematics for a variable shape trailing edge.

Preferred embodiments of the invention relate to a type of fairing arrangement that is kinematically configured to translate and rotate.

In known fairing solutions such as mentioned above, a forward part of the fairing is rigidly assembled to the wing and the aft part of the fairing has a hinged connection to a flap support beam.

Preferred embodiments provide at least one, several or all of the following advantages:
- an interface of a rear part of the fairing and flap is much simpler,
- a lateral movement of the flap system can be compensated,
- a solution proposed by preferred embodiments may be a key enabler for a variable shape trailing edge functionality (VSTE) as demonstrated on eXtra performance Wing demonstrator, see [5] and [6],
- ensures a good aerodynamic condition between forward and aft part of the fairing, The positional determination of the forward fairing is steered by the engagement of the forward fairing into the forward fairing.

Also, more or fully sealed conditions in all high lift configurations can be realized.

BRIEF DESCRIPTION OF THE DRAWINGS

Embodiments of the invention are explained below referring to the accompanying drawings in which:

FIG. 3a is a side view of the fairing arrangement of the aircraft in the clean configuration (flap retracted);

FIG. 3b is a view as in FIG. 3a of the fairing arrangement in a high-lift configuration (flap fully extended);

FIG. 3c is a view as in FIGS. 3a and 3b of the fairing arrangement in a negative variable shape trailing edge configuration;

FIG. 4 is a side view of a high-lift system including a first embodiment of a fairing arrangement wherein fairings thereof are shown partly broken away for illustrative purposes;

DETAILED DESCRIPTION OF THE PREFERRED EMBODIMENTS

Figure 1:
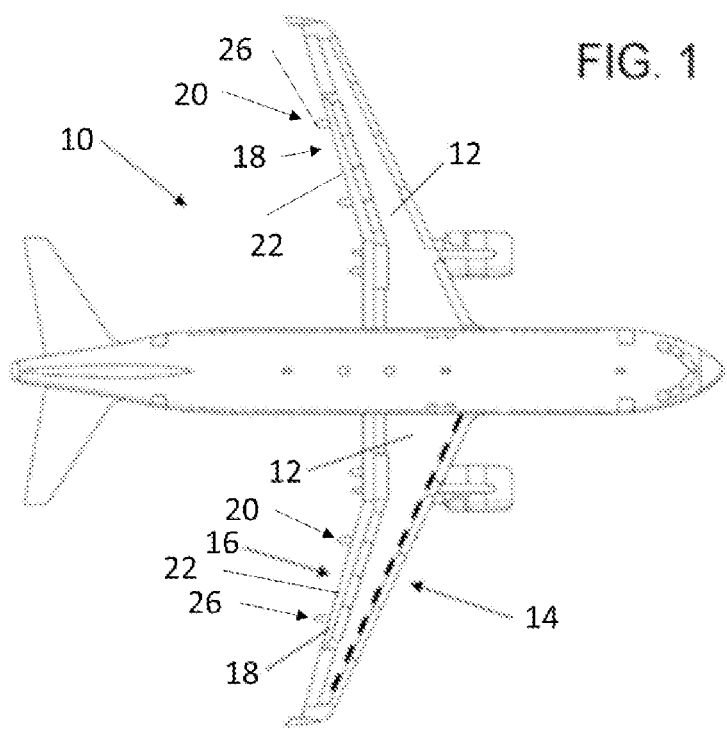
FIG. 1 is a plan view of an aircraft.

An aircraft 10 as shown in FIG. 1 has a pair of aircraft wings 12 extending from a fuselage. Each wing 12 has a leading edge 14 and a trailing edge 16. High-lift systems 18 are arranged at the trailing edge 16. Each high-lift system 18 comprises a high-lift mechanism 20 and fairing arrangements 26. The high-lift mechanism 20 includes a flap 22 and several mounting and guiding mechanisms 24 for mounting the flap 22 at the trailing edge 16 and guiding a movement of the flap 22. The mounting and guiding mechanism 24 serves as a flap support. In some embodiments, the mounting and guiding mechanism 24 includes a flap track for guiding the movement of the flap. Any of the mounting and guiding mechanisms 24 is aerodynamically covered by a fairing arrangement 26.

According to some embodiments, the wing 12 has a variable shape trailing edge functionality (VSTE) where the trailing edge 16 has a variable shape and can be deformed for different flight situations.

Figure 2A:
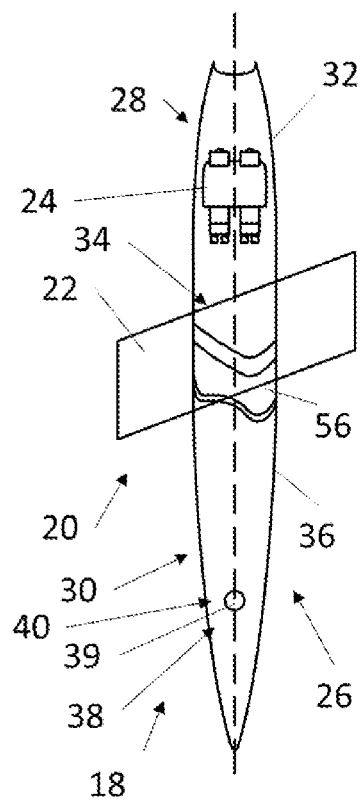
FIG. 2a is a top plan view of a fairing arrangement of the aircraft in a clean configuration (flap retracted)
Figure 2B:
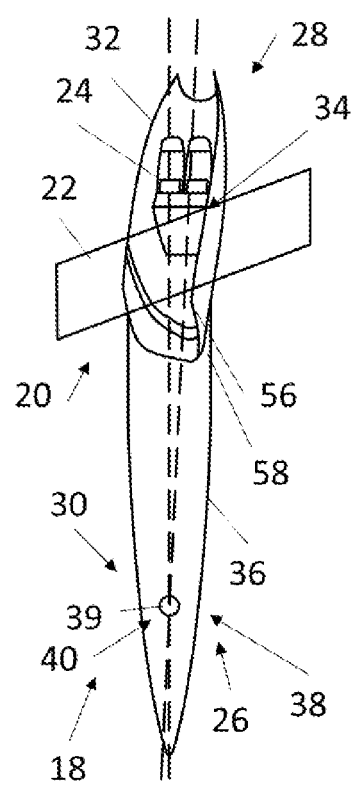
FIG. 2b is a view as in FIG. 2a of the fairing arrangement in a high-lift configuration (flap fully extended)
Figure 2C:
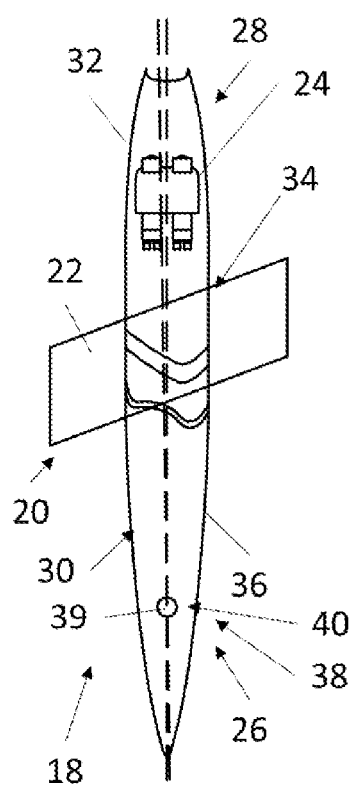
FIG. 2c is a view as in FIGS. 2a and 2b of the fairing arrangement in a negative variable shape trailing edge configuration.

FIGS. 2a, 2b, 2c, 3a, 3b, and 3c show an embodiment of the fairing arrangement 26 in different flap positions, wherein FIGS. 2a and 3a show a clean configuration wherein the flap 22 is retracted, FIGS. 2b and 3c show a high-lift configuration where the flap 22 is fully extended, and FIGS. 2c and 3c show a negative VSTE configuration.

Referring to FIGS. 2a-2c and 3a-3c, there is shown the fairing arrangement 26 for the high-lift mechanism 20 of the aircraft 10. The high-lift mechanism 20 includes the flap 22 to be arranged at a trailing edge 16 of the aircraft wing 12 and the mounting and guiding mechanism 24 for the flap 22.

The fairing arrangement 26 comprises a flap side fairing unit 28 and a wing side fairing unit 30. As seen in flight direction of the aircraft 10, the flap side fairing unit 28 is an aft fairing unit and the wing side fairing unit is a forward fairing unit.

The flap side fairing unit 28 comprises a flap side fairing 32 for covering an aft part of the mounting and guiding mechanism 24 and a flap side fairing mount 34 for mounting the flap side fairing 32 to the flap 22. In the embodiments shown, the flap side fairing mount 34 is configured to mount the flap side fairing 32 rigidly to the flap 22. For example, the shell of the flap side fairing 32 may be mounted with usual bolts, rivets or fasteners (not shown) to the flap 22.

The wing side fairing unit 30 comprises a wing side fairing 36 for covering a forward part of the mounting and guiding mechanism 24 and a wing side fairing mount 38 for mounting the wing side fairing 36 to the wing. The wing side fairing mount 38 is configured to connect the wing side fairing 36 to the wing 12 or the front part of the mounting and guiding mechanism 24 which is attached to the wing 12 such that it is rotatable around an essentially vertical axis 39 directed at least with its largest direction component in a vertical direction. Here, the vertical direction is the direction essentially perpendicular to the spanwise and chordwise directions of the wing 12 (i.e., the direction of lift).

As further shown in FIGS. 2a to 3c, a U-channel shaped forward end portion 56 of the flap side fairing 32 engages into a U-channel shaped rearward end portion 58 of the wing side fairing 36 in order to allow a telescopic and rotational relative movement of the fairings. In some embodiments, the extension and design of the end portions 56, 58 is such that they engage into each other in all flap configurations. FIGS. 3a to 3c show the high lift configurations in a side view. The flap side fairing 32 is in all configurations in contact with the wing side fairing 36. The contact surface is defined in a way that the lateral movement of the flap side fairing 32 guides the rotational position of the wing side fairing 36.

FIGS. 4 to 10 show the fairing arrangement 26 according to a first to fourth embodiment with different designs of the wing side fairing mount 38. Referring to FIGS. 4 to 10, the wing side fairing mount 38 comprises a forward connecting mechanism 40 and a rearward connecting mechanism 42.

The forward connecting mechanism 40 is configured to connect a forward part of the wing side fairing 36 rotatably with one degree of freedom or with two degrees of freedom to the mounting and guiding mechanism 24.

In an embodiment not shown, the forward connecting mechanism 40 just has a simple bearing allowing rotation of the wing side fairing around the essentially vertical axis 39.

In the embodiments shown in FIGS. 4 to 10, the forward connecting mechanism is essentially comprised of a bearing allowing rotation about the essentially vertical axis 39 and further allowing rotation about a second axis 44 perpendicular to this essentially vertical axis 39. For example, the bearing is a spherical bearing 46. In some embodiments, the spherical bearing 46 includes a ball portion 48, a shaft portion 54 and a spherical bearing shell 50. A forward part of the fairing shell of the wing side fairing 36 is held on an end of the shaft portion 54. The ball portion 48 is integrally formed with or rigidly connected to a center of the shaft portion 54 and is held in the spherical bearing shell 50. The spherical bearing shell is fixed to a track member 52 of the mounting and guiding mechanism 24 which itself is, in use, fixed to the structure of the wing 12.

The rearward connecting mechanism 42 is configured to allow a movement of the rearward part of the wing side fairing 36 in a spanwise direction during the rotational movement about the essentially vertical axis 39. Several possible designs of the rearward connecting mechanism 42 are provided in the first to fourth embodiment as shown in FIGS. 4 to 10.

Figure 5:
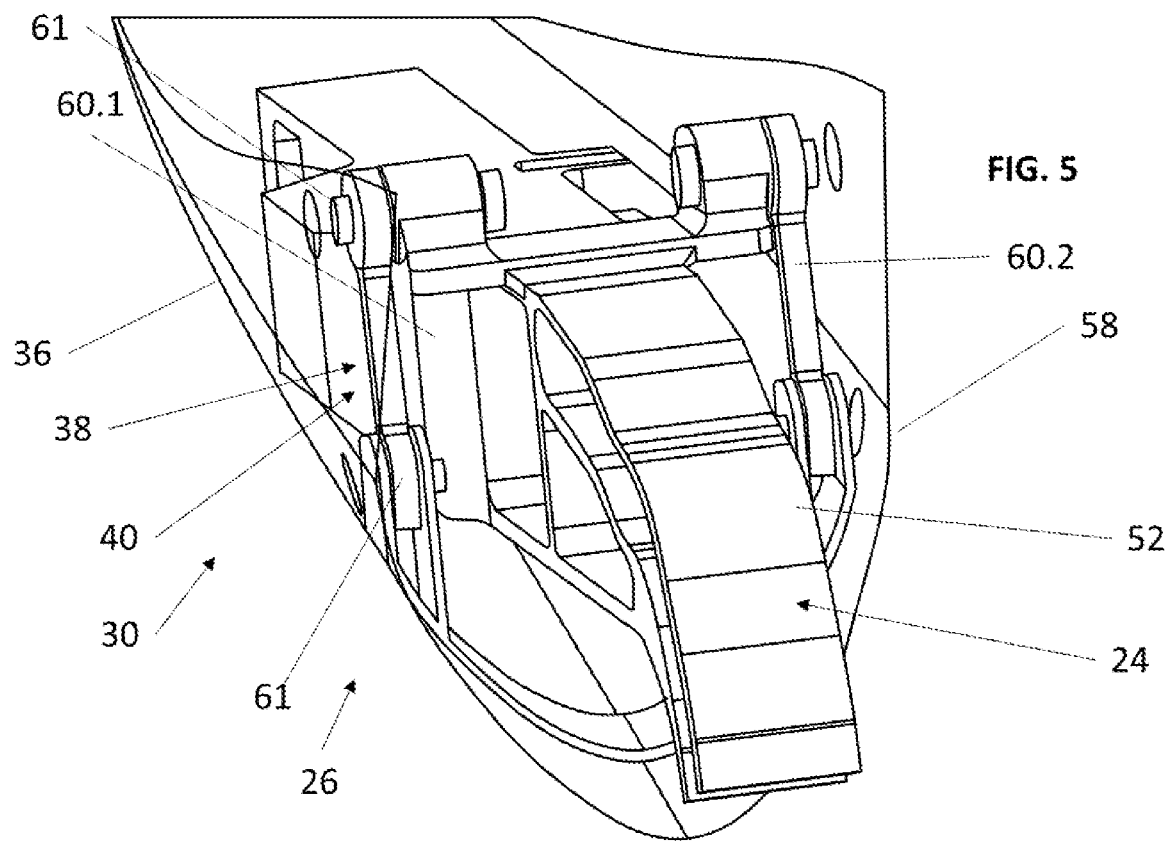
FIG. 5 is a first perspective rear and side view of a wing side fairing unit of the fairing arrangement of the first embodiment.
Figure 6:
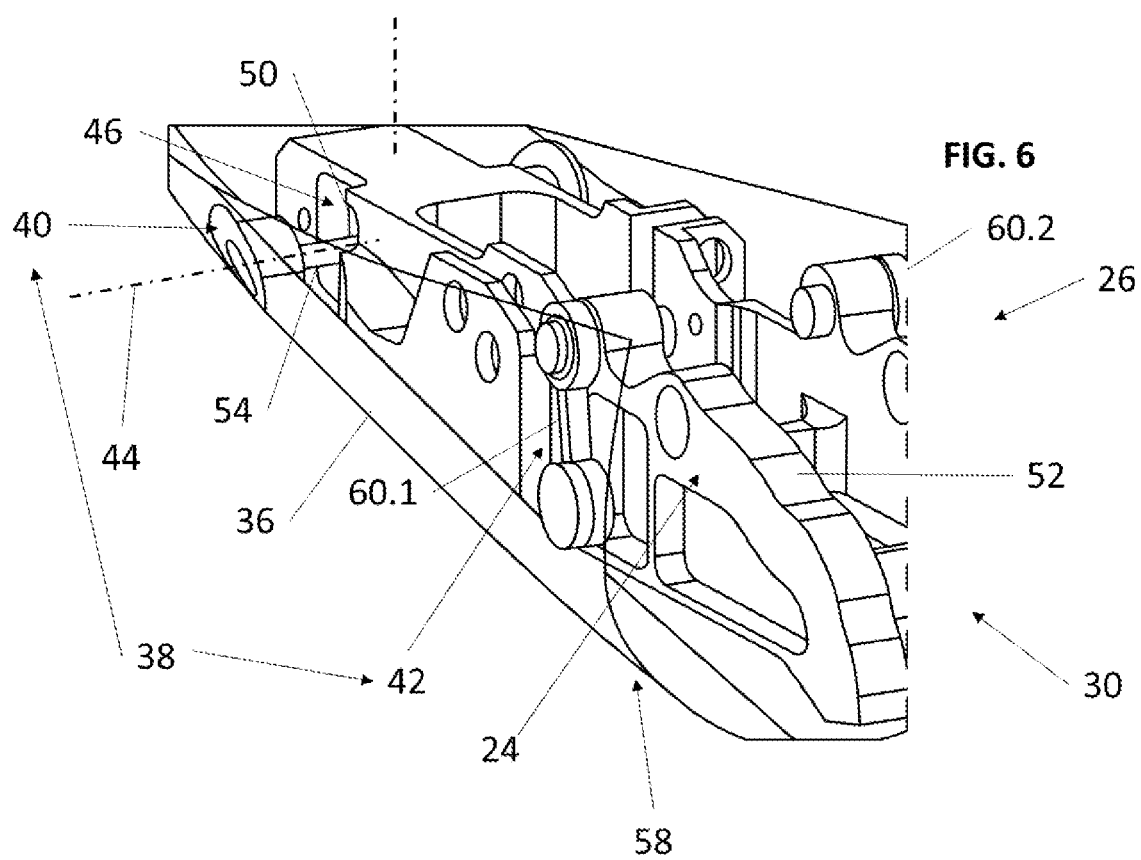
FIG. 6 is a second perspective rear and side view of the wing side fairing unit of the fairing arrangement of the first embodiment.

In a first embodiment as shown in FIGS. 4 to 6, the rearward connecting mechanism 42 comprises a pair of parallel swing struts 60.1, 60.2. Hence, in the first embodiment, the wing side fairing 36 (i.e., a forward fairing of the fairing arrangement 26) is in the rotational axis connected to the wing structure 65 by the spherical bearing 46. In an aft area of the wing side fairing 36 the two parallel fairing struts 60.1, 60.2 are located to lock the rotational degree of freedom around an axis in line of flight and around an axis in spanwise direction. The resulting movement is not a pure rotation around the vertical axis 39 but more a complex combination of rotations. The required rotation of the wing side fairing 36 is limited to just a few degrees and the here described movement is working well as a design solution.

The swing struts 60.1, 60.2 are equipped with multi-axis bearings such as spherical bearings 61 at their ends in order to connect the strut ends movably to the track member 52 and the wing side fairing 36, respectively.

As a variation (not shown), the struts 60.1, 60.2 can be replaced by flexible tensile means or flexible elements like steel cables in combination with a roller or linear bearing below the track member 52.

Figure 7:
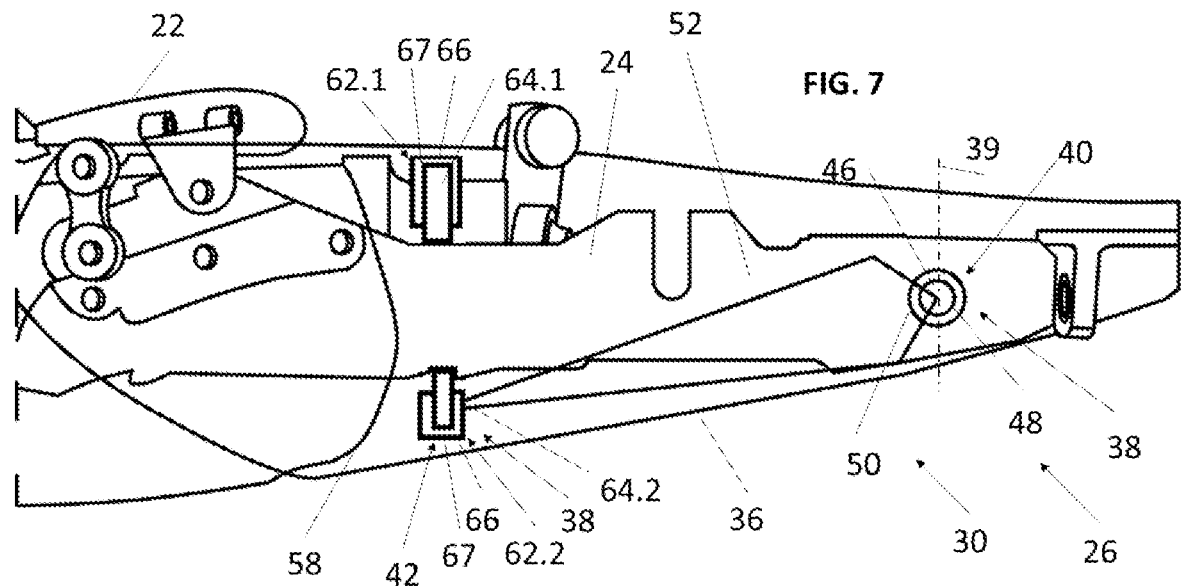
FIG. 7 is a side view of the wing side fairing unit of the fairing arrangement according to a second embodiment, wherein a fairing shell is shown partly broken away for illustrative purposes.
Figure 8:
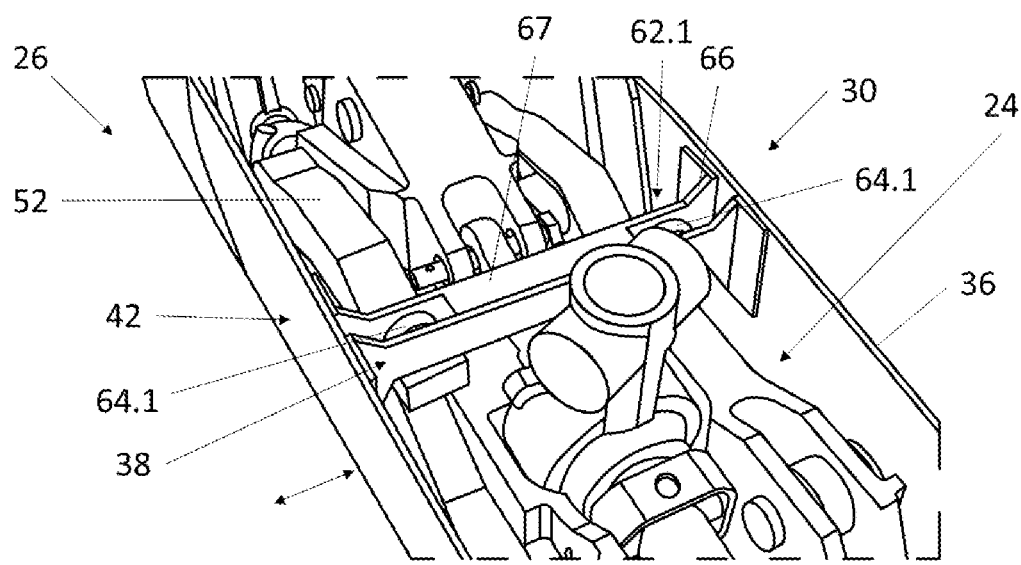
FIG. 8 is a perspective view seen from above and a side of the wing side fairing unit of the fairing arrangement according to the second embodiment.

In a second embodiment as shown in FIGS. 7 and 8, the rearward connecting mechanism 42 comprises an upper track and roller arrangement 62.1 and a lower track and roller arrangement 62.2. The track and roller arrangements 62.1, 62.2 comprise rollers 64.1, 64.2 rotatably mounted on a roller support 66, e.g., a fairing bridge 67, at an inside the wing side fairing 36 and allowing movement of the aft part of the wing side fairing 36 in the spanwise direction. In a variant not shown, sliders are used instead of some or all of the rollers 64.1, 64.2. In the second embodiment, the wing side fairing 36 is connected to the wing structure 65 with the spherical bearing 46 as explained above and a combination of two rollers 64.1 above the track member 52 and two rollers 64.2 below the track member 52. As a variation of this solution which is illustrated schematically in FIG. 10 for the fourth embodiment, also linear bearings 68 can be used instead of rollers 64.1, 64.2.

Figure 9:
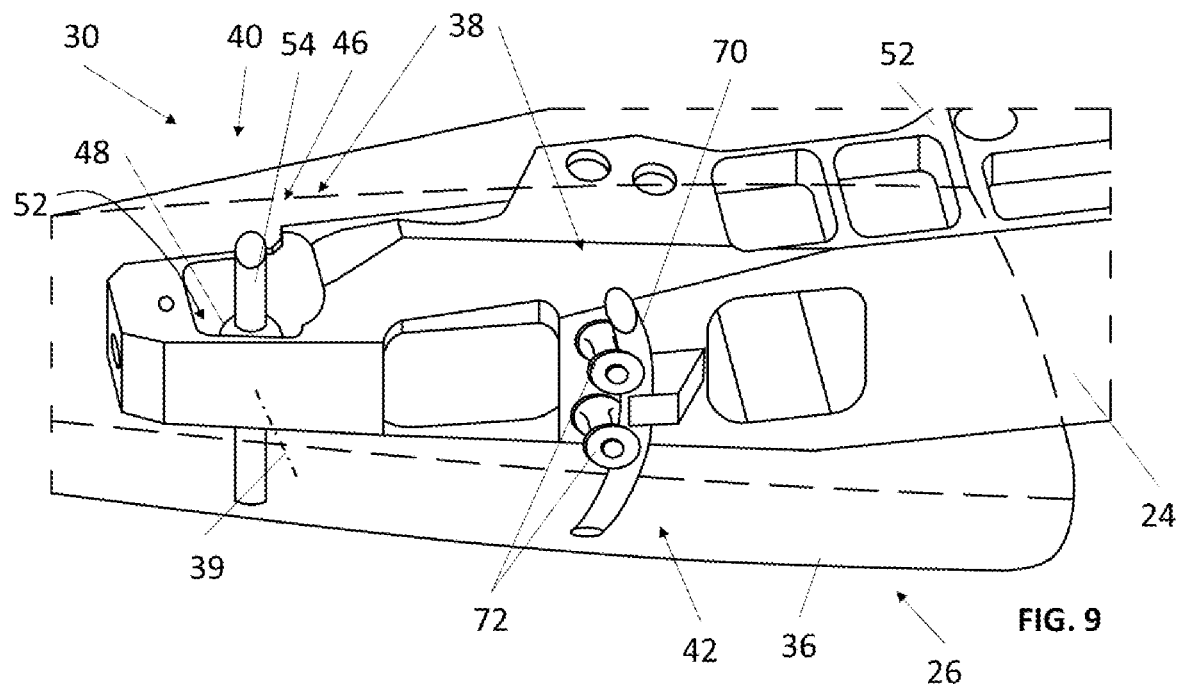
FIG. 9 is a perspective view seen from below and from a side of the wing side fairing unit of the fairing arrangement according to a third embodiment wherein a fairing shell is indicated in broken lines only.

In a third embodiment as shown in FIG. 9, the rearward connecting mechanism 42 comprises a curved track 70 and rollers 72 running on that curved track 70. In the embodiment shown, the curved track 70 is fixed inside the wing side fairing 36 and the rollers 72 are rotatably mounted on a bottom surface of the mounting and guiding mechanism 24, especially the track member 52. In other embodiments (not shown), the rollers 72 are rotatably mounted in the wing side fairing 30 while the track 70 is mounted on the mounting and guiding mechanism 24. In the third embodiment. the aft guidance of the wing side fairing 36 is realized by a set of rollers 72 running on the curved track 70 with the track center point in line with the vertical rotation axis 39.

Figure 10:
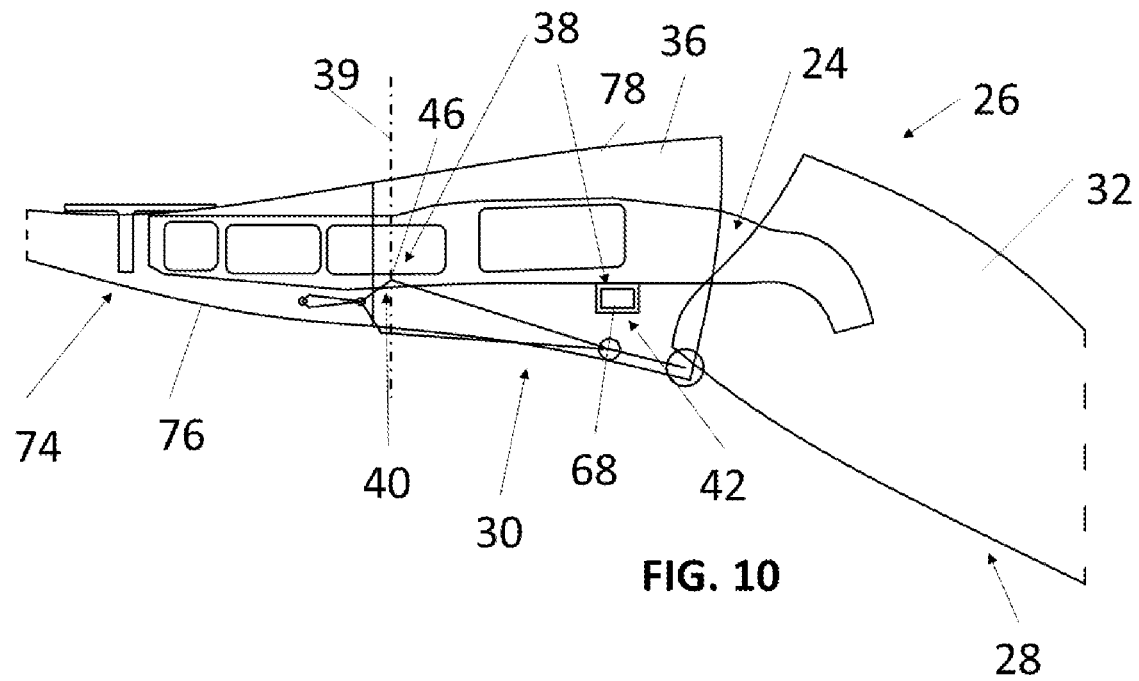
FIG. 10 is a side view of the fairing arrangement according to a fourth embodiment.

In the fourth embodiment as shown in FIG. 10, an alternative arrangement of the fairings 36, 32 is shown. Here, the fairing arrangement 26 comprises a fixed front fairing unit 74 configured to be rigidly fixed to the wing 12, wherein the wing side fairing unit 30 is configured as intermediate movable wing side fairing unit arranged between fixed front fairing unit 74 and the flap side fairing unit 28.

In other words, a forward fairing for covering a front part of the mounting and guiding mechanism 24 is split into a fixed fairing 76 and the wing side fairing 36, here configured as an intermediate fairing 78. The intermediate fairing 78 is mounted with the forward connecting mechanism 40 and the rearward connecting mechanism 42. In the fourth embodiment, the rearward connecting mechanism 42 includes the linear bearing 68 allowing movement of the aft part of the intermediate fairing 78 in spanwise direction for rotation of this intermediate fairing 78 about the essentially vertical axis 39, but of course the rearward connecting mechanism 42 could also have the design of any of the other embodiments as explained above.

The different features of different embodiments can be combined as needed. For example, the rearward connecting mechanism 42 may comprise any combination of swing struts, tensile means, cables, linear bearings, track and roller or slider arrangements.

A functionally improved fairing arrangement 26 for a high-lift mechanism 20 of an aircraft 10 has been described. The high-lift mechanism 20 includes a flap 22 to be arranged at a trailing edge 16 of an aircraft wing 12 and a mounting and guiding mechanism 24 for the flap 22. The fairing arrangement 26 comprises a flap side fairing unit 28 and a wing side fairing unit 30. The flap side fairing unit 28 comprises a flap side fairing 32 for covering an aft part of the mounting and guiding mechanism 24 and a flap side fairing mount 34 for mounting the flap side fairing 32 to the flap 22. The wing side fairing unit 30 comprises a wing side fairing 36 for covering a forward part of the mounting and guiding mechanism 24 and a wing side fairing mount 38 for mounting the wing side fairing 36 to the wing 12. The wing side fairing mount 38 is configured for connecting the wing side fairing 36 movably to the wing 12 such that the wing side fairing 36 is rotatable around an axis 39 directed at least partially in a vertical direction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 wing
14 leading edge
16 trailing edge
18 high-lift system
20 high-lift mechanism
22 flap
24 mounting and guiding mechanism
26 fairing arrangement
28 flap side fairing unit
30 wing side fairing unit
32 flap side fairing
34 flap side fairing mount
36 wing side fairing
38 wing side fairing mount
39 vertical axis
40 forward connecting mechanism
42 rearward connecting mechanism
44 second axis
46 spherical bearing
48 ball portion
50 bearing shell
52 track member
54 shaft portion
56 forward end portion
58 rearward end portion
60.1 first swing strut
60.2 second swing strut
61 spherical bearing at end of strut
62.1 upper track and roller arrangement
62.2 lower track and roller arrangement
64.1 upper roller
64.2 lower roller
65 wing structure
66 roller support
67 fairing bridge
68 linear bearing
70 curved track
72 roller
74 fixed front fairing unit
76 forward fairing
78 intermediate fairing

The invention claimed is:

1. A fairing arrangement for a high-lift mechanism of an aircraft, wherein the high-lift mechanism includes a flap to be arranged at a trailing edge of an aircraft wing and a mounting and guiding mechanism for the flap,
the fairing arrangement comprising a flap side fairing unit and a wing side fairing unit,
the flap side fairing unit comprising a flap side fairing for covering an aft part of the mounting and guiding mechanism and a flap side fairing mount for mounting the flap side fairing to the flap,
the wing side fairing unit comprising a wing side fairing for covering a forward part of the mounting and guiding mechanism and a wing side fairing mount for mounting the wing side fairing to the wing,
wherein the wing side fairing mount is configured to connect the wing side fairing movably to the wing such that the wing side fairing is rotatable around an axis directed at least partially in a vertical direction.

2. The fairing arrangement according to claim 1, wherein the wing side fairing mount comprises a forward connecting mechanism configured to connect a forward part of the wing side fairing rotatably with at least one or with two degrees of freedom to the mounting and guiding mechanism.

3. The fairing arrangement according to claim 2, wherein the forward connecting mechanism includes a multi-axis bearing or a spherical bearing.

4. The fairing arrangement according to claim 1, wherein the wing side fairing mount comprises a rearward connecting mechanism configured to connect a rearward part of the wing side fairing such that the wing side fairing is movable in a spanwise direction.

5. The fairing arrangement according to claim 4,
wherein the wing side fairing mount comprises a forward connecting mechanism configured to connect a forward part of the wing side fairing rotatably with at least one or with two degrees of freedom to the mounting and guiding mechanism, and
wherein the rearward connecting mechanism includes at least one or several of the group consisting of:
a swing strut,
a pair of parallel swing struts,
a tensile means, a cable,
an arrangement of a track and rollers or sliders,
an upper track and roller or slider arrangement,
a lower track and roller or slider arrangement,
a track curved around the rotation axis of the forward connecting mechanism in combination with a set of rollers or sliders running on the curved track, and
a linear bearing.

6. The fairing arrangement according to claim 1, wherein a forward end portion of the flap side fairing engages into a rearward end portion of the wing side fairing to allow a telescopic and rotational relative movement of said wing side fairing and said flap side fairing.

7. The fairing arrangement according to claim 1,
wherein a fixed front fairing unit is configured to be rigidly fixed to the wing, and
wherein the wing side fairing unit is configured as an intermediate movable wing side fairing unit arranged between fixed front fairing unit and the flap side fairing unit.

8. A high-lift system for an aircraft, comprising
a high-lift mechanism including a flap to be arranged at a trailing edge of an aircraft wing and a mounting and guiding mechanism for the flap, and
a fairing arrangement according to claim 1.

9. An aircraft wing comprising a high-lift system according to claim 8.

10. An aircraft, comprising a wing according to claim 9.

11. An aircraft, comprising a high-lift system according to claim 8.

12. An aircraft wing comprising a fairing arrangement according to claim 1.

13. An aircraft, comprising a wing according to claim 12.

14. An aircraft, comprising a fairing arrangement according to claim 1.

* * * * *